US008056095B2

(12) United States Patent  
Chen (10) Patent No.: US 8,056,095 B2  
(45) Date of Patent: Nov. 8, 2011

(54) STORAGE/RETRIEVAL DEVICE FOR OPTICAL DISKS

(76) Inventor: Chiu-Yuan Chen, Chung-Ho (TW)

( * ) Notice: Subject to any disclaimer, the term of this patent is extended or adjusted under 35 U.S.C. 154(b) by 938 days.

(21) Appl. No.: 11/964,088

(22) Filed: Dec. 26, 2007

(65) Prior Publication Data

US 2009/0172718 A1 Jul. 2, 2009

(51) Int. Cl.
*G11B 17/24* (2006.01)

(52) U.S. Cl. ............... 720/624; 720/652; 369/30.62; 369/30.71

(58) Field of Classification Search ............... 369/30.06, 369/30.62, 30.71, 30.7, 30.56, 196, 77.11; 720/652, 624, 619, 617, 626, 600
See application file for complete search history.

(56) References Cited

U.S. PATENT DOCUMENTS

| | | | | |
|---|---|---|---|---|
| 6,603,715 B1* | 8/2003 | Klein | | 369/30.86 |
| 6,901,597 B2* | 5/2005 | Leung | | 720/600 |
| 2005/0289570 A1* | 12/2005 | Jernstrom et al. | | 720/624 |
| 2006/0005208 A1* | 1/2006 | Jernstrom et al. | | 720/600 |
| 2006/0174253 A1* | 8/2006 | Yamagami et al. | | 720/619 |
| 2006/0187771 A1* | 8/2006 | Elbaum | | 369/30.56 |
| 2007/0291597 A1* | 12/2007 | Lee et al. | | 369/30.62 |

* cited by examiner

*Primary Examiner* — Julie Anne Watko
(74) *Attorney, Agent, or Firm* — Alan Kamrath; Kamrath & Associates PA (57) ABSTRACT

A storage/retrieval device for optical disks includes a container having an access slot. A disk shelf is rotatably mounted in the container and includes a plurality of storage compartments each for receiving an optical disk. A driving roller and a driven roller are rotatably mounted in the container for moving an optical disk into or out of the container via the access slot. An ejecting member includes a first end pivotably supported in the container and a second end operably coupled with the driving roller. The ejecting member is pivotable between a first position in one of the storage compartments for moving an optical disk in the storage compartment out of the storage compartment and a second position outside the storage compartment. A motor is provided to drive the driving roller for rotating the driving roller and the driven roller in opposite directions and for pivoting the ejecting member.

6 Claims, 14 Drawing Sheets

STORAGE/RETRIEVAL DEVICE FOR OPTICAL DISKS

BACKGROUND OF THE INVENTION

The present invention relates to a storage/retrieval device for optical disks and, more particularly, to a simplified storage/retrieval device that allows easy storage/retrieval of optical disks.

Optical disks are widely utilized to store electronic information in various fields including music, pictures, images, texts, etc. Operational convenience and reliable storage/retrieval of optical disks have become an important subject in view of the increasing use and increasing types of the optical disks. A currently existing storage/retrieval device includes a disk shelf having a plurality of storage compartments for receiving optical disks, a holding/transporting device for moving an optical disk into or out of the storage/retrieval device via an access slot, and an ejecting device for moving the optical disk out of one of the storage compartments. However, this storage/retrieval device requires three motors and three sets of corresponding transmission mechanisms for separate operations of the disk shelf, the holding/transporting device, and the ejecting device.

A need exists for an improved storage/retrieval device that is simplified without sacrificing convenient operation and reliable storage/retrieval of optical disks.

BRIEF SUMMARY OF THE INVENTION

The present invention solves this need and other problems in the field of storage/retrieval operation of optical disks by providing, in a preferred form, a storage/retrieval device for optical disks including a container having an access slot. A disk shelf is rotatably mounted in the container and includes a plurality of storage compartments each for receiving an optical disk. A disk shelf motor is provided for driving the disk shelf to rotate. A first driving roller is rotatably mounted to a first fixed seat in the container. The first driving roller includes a first axle having an end. A first driven roller is rotatably mounted to the first fixed seat and spaced from the first driving roller by a gap. The gap between the first driving roller and the first driven roller faces the access slot. A first pulley is mounted to the end of the first axle to rotate therewith. A first wheel is rotatably mounted around the end of the first axle. A first friction member is mounted around the end of the first axle and between the first pulley and the first wheel. A first compression spring is mounted around the end of the first axle. The first compression spring biases the first wheel against the first friction member and the first pulley such that when the first driving roller rotates, the first wheel rotates together with the pulley due to friction between the first friction member and the first wheel and friction between the first friction member and the first pulley. A first motor is coupled with the first pulley for driving the first pulley and the first driving roller such that the first driving roller and the first driven roller rotate in opposite directions to move an optical disk into or out of the container via the access slot. A first ejecting member includes a first end pivotably supported in the container and a second end. The first ejecting member is pivotable between a first position in one of the storage compartments for moving an optical disk in the storage compartment out of the storage compartment and a second position outside the storage compartment. A first driving wheel is rotatably supported in the container and coupled with the second end of the first ejecting member. A first belt is connected between the first driving wheel and the first pulley such that rotation of the first pulley causes rotation of the first driving wheel and pivotal movement of the first ejecting member.

In the most preferred form, the first fixed seat further includes spaced first and second plates each having an elongated slot. The end of the first axle rotatably extends through the elongated slot of the second plate. The other end of the first axle rotatably extends through the elongated slot of the first plate. The first driving roller is movable along a longitudinal axis thereof. The first driven roller includes a second axle rotatably extending through the elongated slots of the first and second plates. The first driven roller is movable along a longitudinal axis thereof. The first driven roller is movable along the first and second elongated slots in a direction perpendicular to the longitudinal axis of the first driven roller. A resilient pressing member includes two ends respectively pressing against two ends of the second axle. The resilient pressing member further includes an intermediate portion between the two ends thereof and fixed to the first fixed seat. Two springs are provided and each have a first end attached to the first fixed seat and a second end attached to one of the two ends of the resilient pressing member, biasing the two ends of the resilient pressing member against the two ends of the second axle to bias the first driven roller toward the first driving roller. The second end of the first ejecting member includes an elongated guide groove having two ends. The first driving wheel includes an eccentric rod projecting from a side thereof. The eccentric rod is slideably received in the elongated guide groove of the first ejecting member. The first ejecting member pivots from one of the first and second positions to the other of the first and second positions when the eccentric rod is moving from one of the two ends of the elongated guide groove to the other of the two ends of the elongated guide groove. A resistant force imparted to the eccentric rod is larger than the frictional between the first friction member and the first wheel when the eccentric rod is at one of the two ends of the elongated guide groove such that the first wheel and the first driving wheel do not rotate while the first driving roller is rotating. When the eccentric rod is at one of the two ends of the elongated guide groove of the first ejecting member while the first driving roller is rotating, the first driving roller and the first driven roller move an optical disk ejected from one of the storage compartments by the first ejecting member out of the container via the access slot or move an optical disk into one of the storage compartments.

In the most preferred form, an optical disk drive is mounted in the container and includes an access opening. A second driving roller is rotatably mounted to a second fixed seat in the container. The second driving roller includes a second axle having an end. A second driven roller is rotatably mounted to the second fixed seat and spaced from the second driving roller by a gap. The gap between the second driving roller and the second driven roller faces the access opening. A second pulley is mounted to the end of the second axle to rotate therewith. A second wheel is rotatably mounted around the end of the second axle. A second friction member is mounted around the end of the second axle and between the second pulley and the second wheel. A second compression spring is mounted around the end of the second axle. The second compression spring biases the second wheel against the second friction member and the second pulley such that when the second driving roller rotates, the second wheel rotates together with the second pulley due to friction between the second friction member and the second wheel and friction between the second friction member and the second pulley. A second motor is coupled with the second pulley for driving the second pulley and the second driving roller such that the second driving roller and the second driven roller rotate in opposite directions to move an optical disk in one of the storage compartments into the optical disk drive via the access opening or to move an optical disk from the optical disk drive into one of the storage compartments. A second ejecting member includes a first end pivotably supported in the container and a second end. The second ejecting member is pivotable between a first position in one of the storage compartments for moving an optical disk in the storage compartment out of the storage compartment and a second position outside the storage compartment. A second driving wheel is rotatably supported in the container and coupled with the second end of the second ejecting member. A second belt is connected between the second driving wheel and the second pulley such that rotation of the second pulley causes rotation of the second driving wheel and pivotal movement of the second ejecting member.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Figure 1:
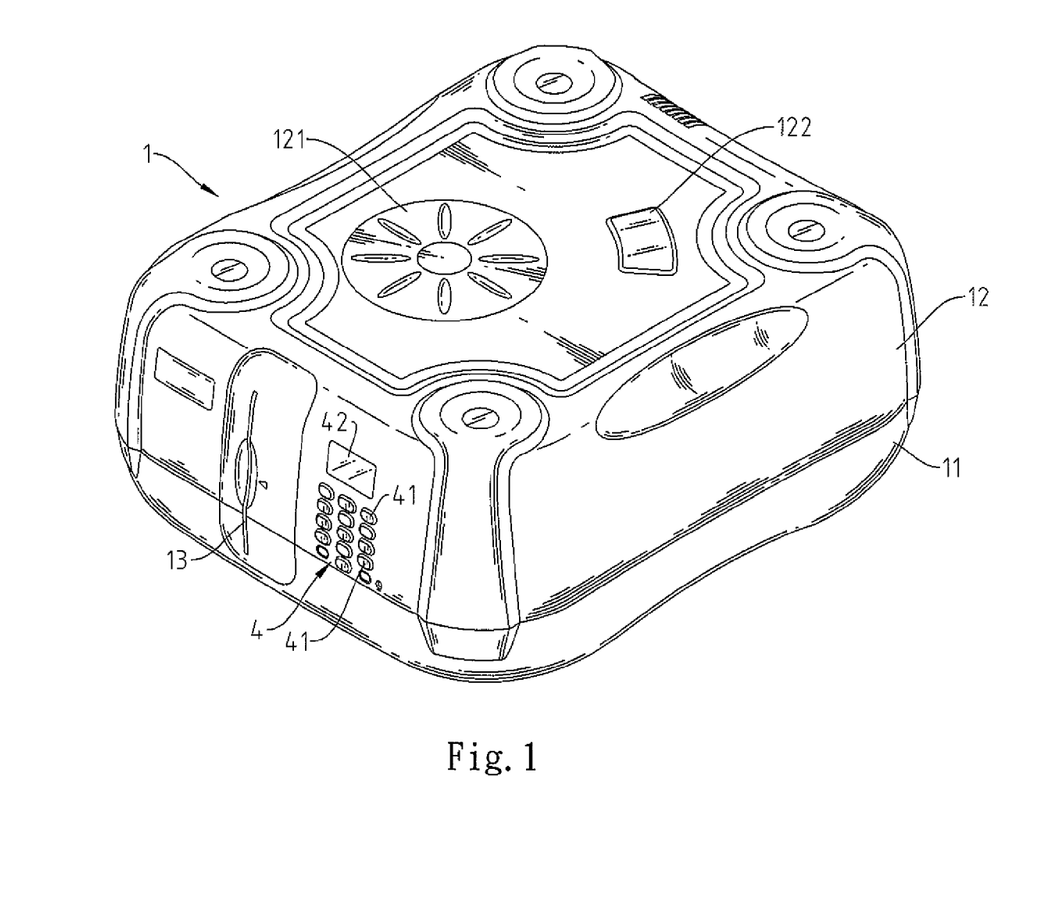
FIG. 1 shows a diagrammatic perspective view of a storage/retrieval device for optical disks according to the preferred teachings of the present invention.

A storage/retrieval device according to the preferred teachings of the present invention is shown in the drawings and generally includes a container 1 comprised of a casing 11 and a cover 12. With reference to FIG. 1, the body 1 includes an access slot 13 on a side thereof. The container 1 further includes a control/display means 4 adjacent the access slot 13. According to the preferred form shown, the control/display means 4 includes a plurality of control buttons 41 and a display 42 such as a digital liquid crystal display. Further, the container 1 includes two windows 121 and 122. A plurality of rollers 14 is mounted on a bottom of the container 1.

Figure 2:
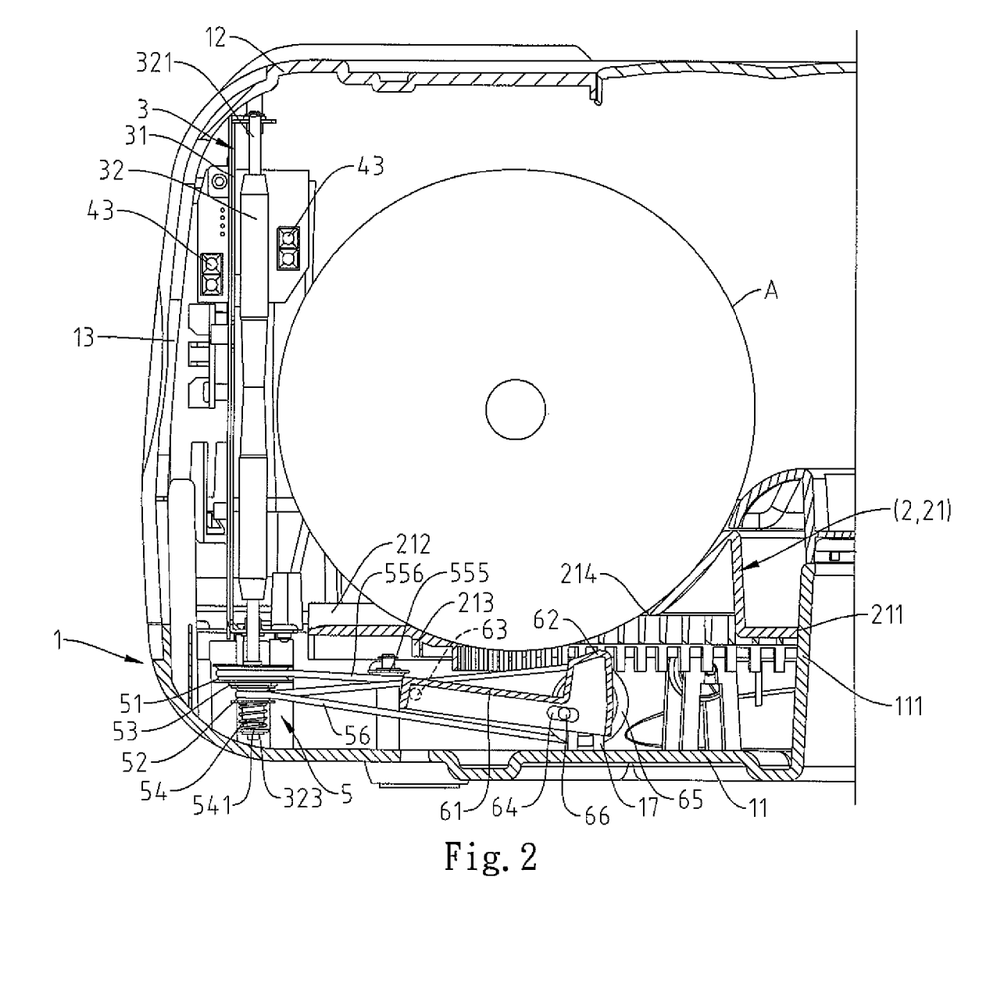
FIG. 2 shows a partial, cross-sectional view of the storage/retrieval device of FIG. 1 with an optical disk in the storage/retrieval device in a storage state.
Figure 4:
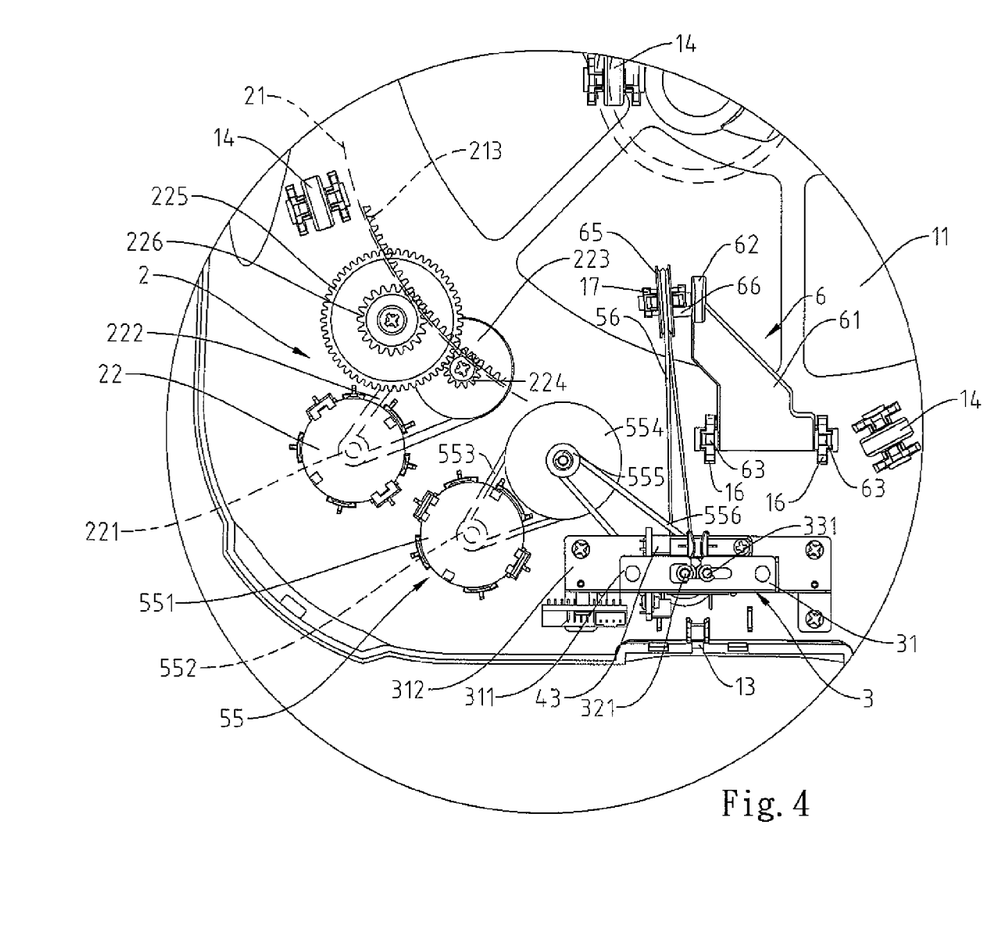
FIG. 4 shows a partial, enlarged, bottom view of the storage/retrieval device of FIG. 1.
Figure 5:
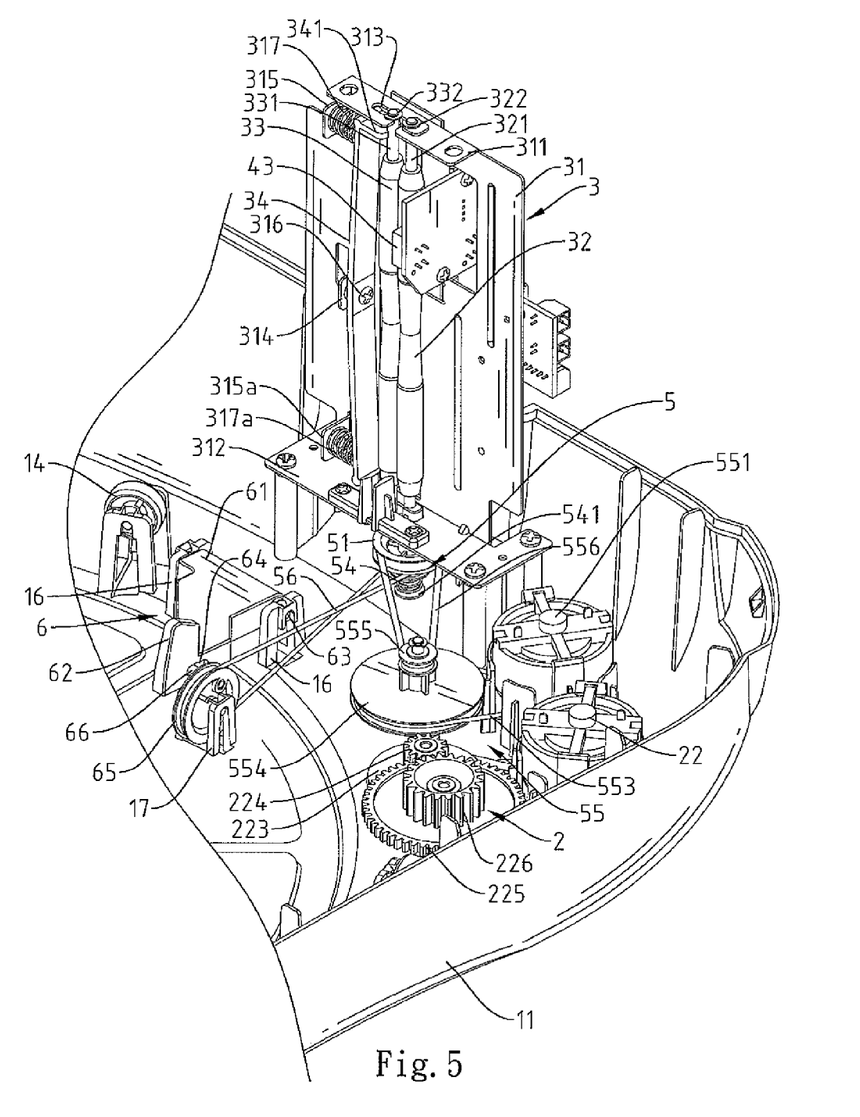
FIG. 5 shows a partial, perspective view of the components of FIG. 4.
Figure 6:
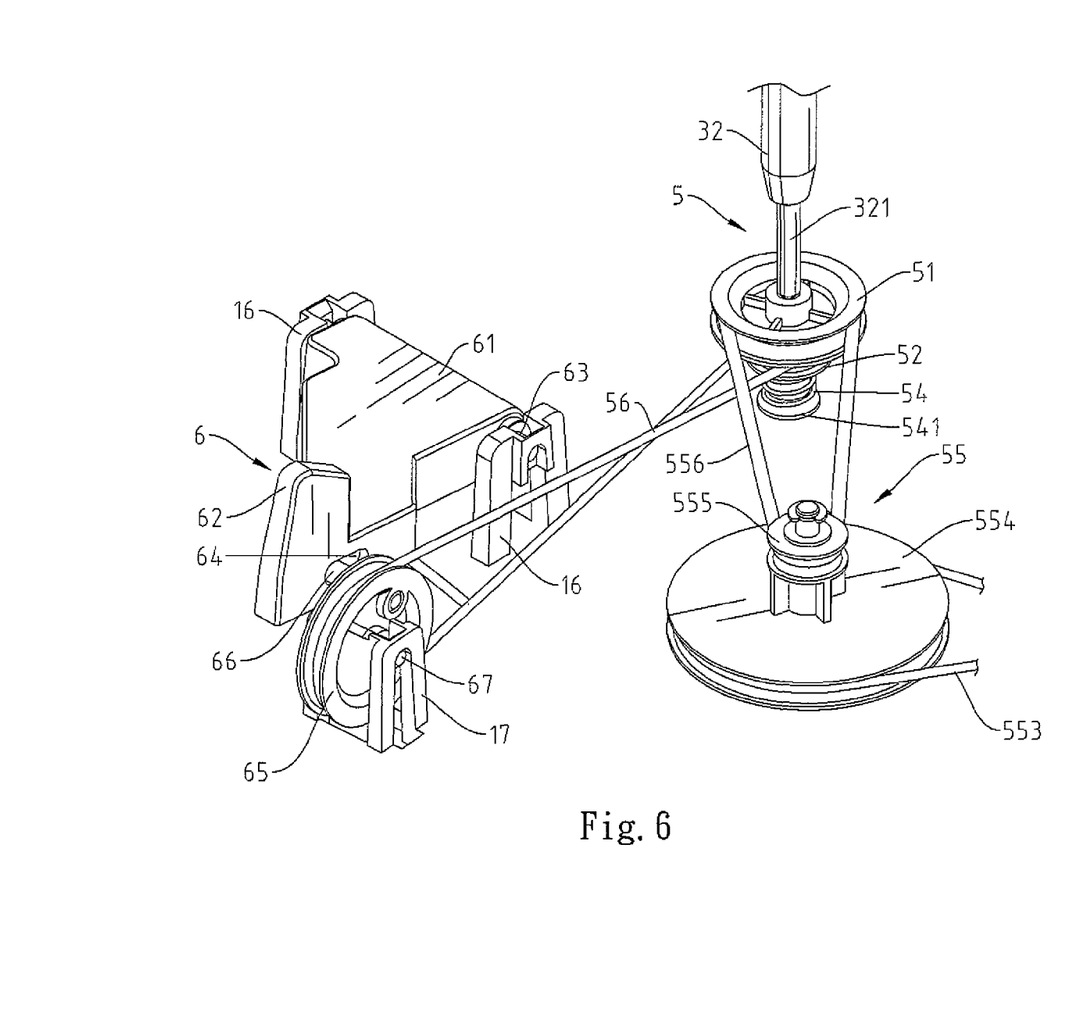
FIG. 6 shows a perspective view of an ejecting device and a driving device of FIG. 5.
Figure 7:
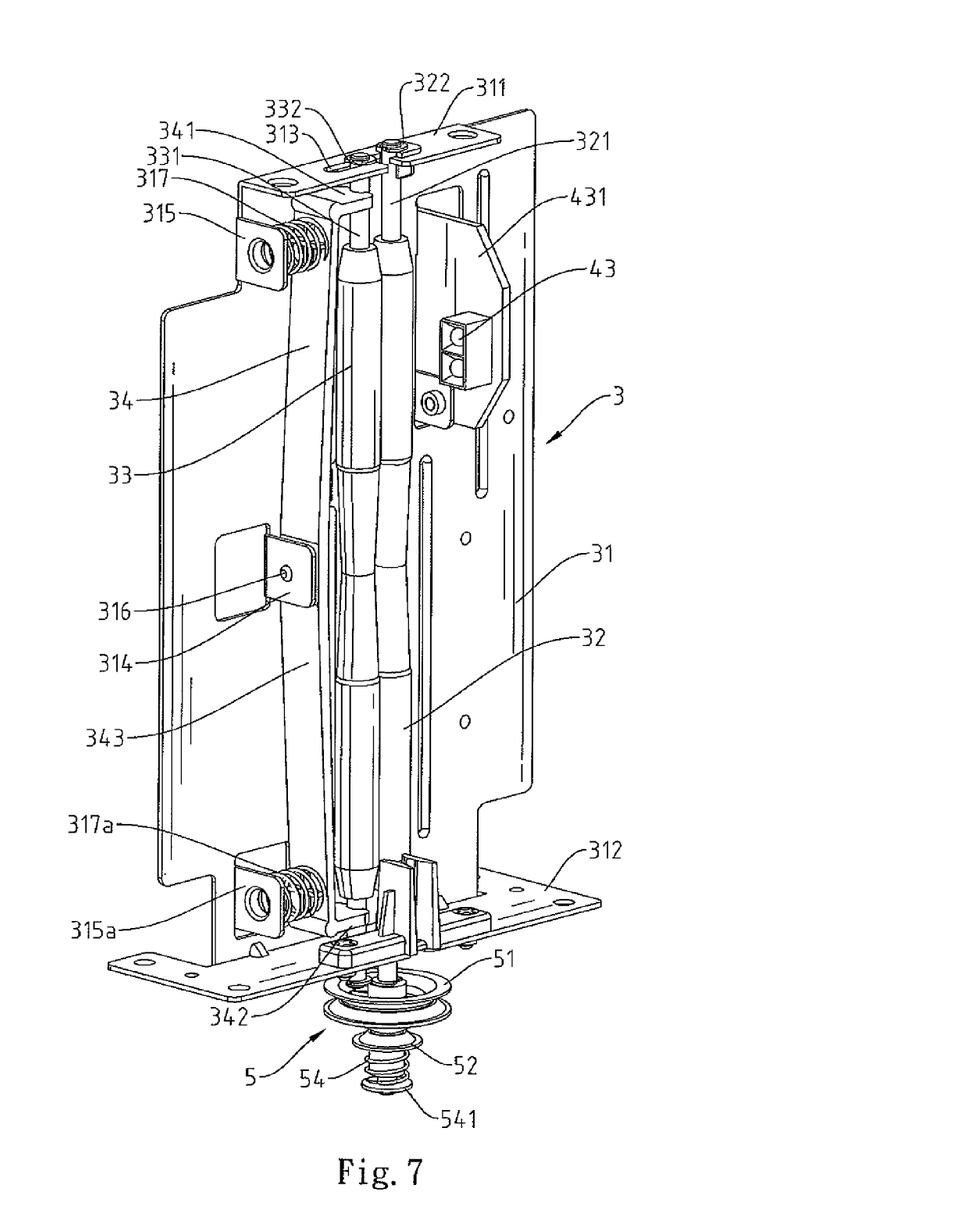
FIG. 7 shows a perspective view of a holding/transporting device and the driving device of FIG. 5.
Figure 9:
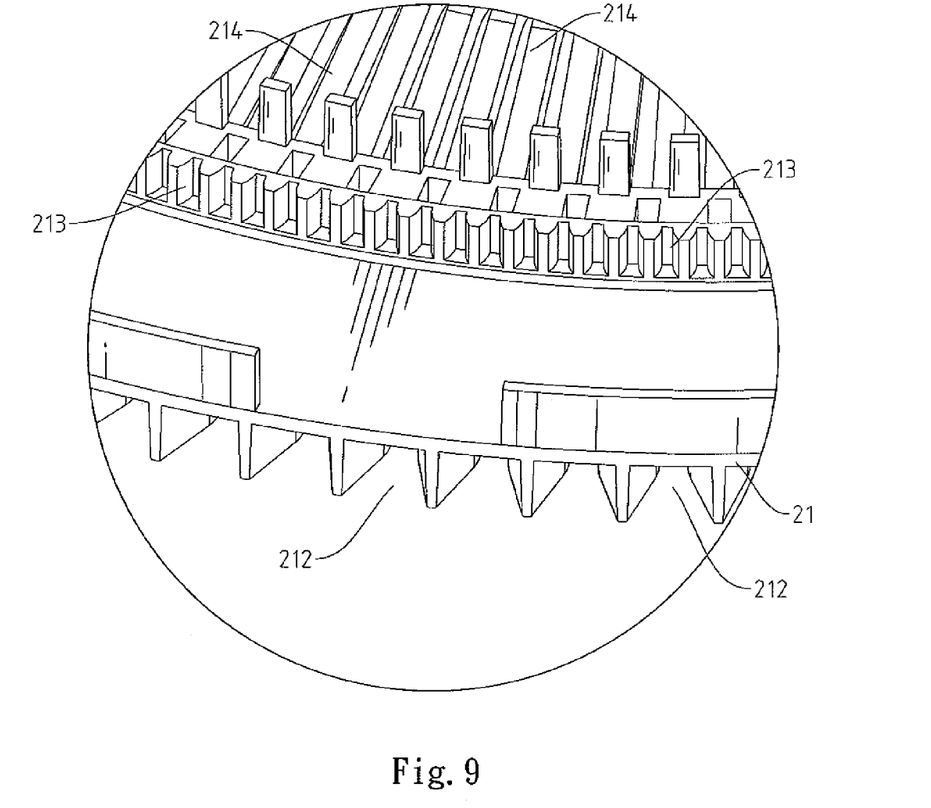
FIG. 9 shows a partial, enlarged, perspective view of a shelf device of the storage/retrieval device of FIG. 1.

With reference to FIGS. 2, 4, and 9, the container 1 receives a shelf device 2. According to the preferred form shown, the shelf device 2 includes a disk shelf 21 rotatably supported by the rollers 14 and a motor 22 for driving the disk shelf 21 to rotate. The disk shelf 21 includes a central hole 211 rotatably receiving an axle 111 fixed to a central portion of the casing 11. The disk shelf 21 includes a plurality of spaced storage compartments 212 in a side thereof. Each storage compartment 212 can receive an optical disk A. A plurality of spaced openings 214 is defined in an opposite side of the disk shelf 21. Each opening 214 is in communication and aligned with one of the storage compartments 212. A ring gear 213 is provided on an outer periphery of the disk shelf 21. With reference to FIG. 4, a pulley 221 is coupled with an output shaft of the motor 22 and connected to another pulley 223 by a belt 222. A concentric gear 224 is mounted to the pulley 223 and meshes with a gear train 225 that has a gear 226 meshed with the ring gear 213. Thus, the disk shelf 21 is rotated when the motor 22 is activated. One or more sensors can be provided to detect an angular position of the disk shelf 21.

Figure 3:
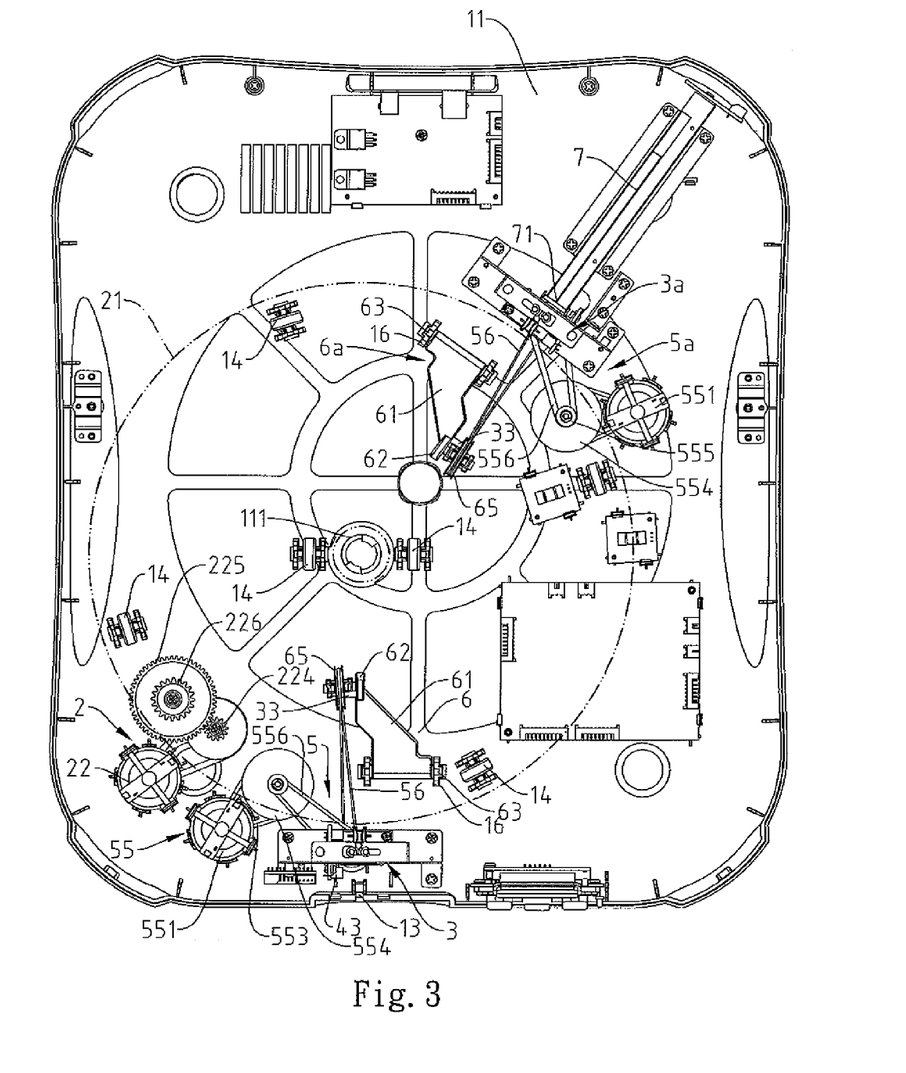
FIG. 3 shows a bottom view of the storage/retrieval device of FIG. 1.

According to the preferred form shown, a first holding/transporting device 3 (FIG. 3) is mounted in the container 1 and located adjacent to the access slot 13 and the disk shelf 21. Also mounted in the container 1 are a first driving device 5 and a first ejecting device 6 in association with the first holding/transporting device 3. With reference to FIGS. 5-8, the first holding/transporting device 3 includes a fixed seat 31 fixed to the bottom of the casing 11 and spaced upper and lower plates 311 and 312 extending from and perpendicular to the fixed seat 31. A driving roller 32 includes an axle 321 having an upper end engaged in an elongated slot 313 in the upper plate 311. The upper end of the axle 321 is retained by a retainer 322 such as a C-clip to prevent the axle 321 from disengaging from the upper plate 311. The axle 321 further has a lower end rotatably extending through the lower plate 312 and coupled with the first driving device 5. A driven roller 33 includes an axle 331 having an upper end rotatably and slideably received in the elongated slot 313 of the upper plate 311. The upper end of the axle 331 is retained by a retainer 332 such as a C-clip to prevent the axle 331 from disengaging from the upper plate 311. The axle 331 further includes a lower end rotatably and slideably received in an elongated slot 313 in the lower plate 312. The driving roller 32 and the driven roller 33 are preferably made of silicon rubber and mounted to an inner side of the fixed seat 31 so that a gap between the rollers 32 and 33 faces the access slot 13. It can be appreciated that the driving roller 32 is movable along a longitudinal axis thereof, and the driven roller 33 is movable along a longitudinal axis thereof that is parallel to the longitudinal axis of the driving roller 32. Furthermore, the driven roller 33 is movable in the elongated slots 313 in a direction perpendicular to the longitudinal axes of the rollers 32 and 33. It can be appreciated that the driving roller 32 and the driven roller 33 rotate in opposite directions for clamping and moving an optical disk A into or out of the container 1 via the access slot 13 for storage or retrieval of the optical disk A.

According to the preferred form shown, a resilient pressing member 34 is mounted adjacent the driven roller 33. The resilient pressing member 34 is substantially U-shaped and includes an upper arm 341 pressing against the upper end of the axle 331 and a lower arm 342 pressing against the lower end of the axle 331. The resilient pressing member 34 further includes an intermediate portion 343 between the upper and lower arms 341 and 342. The intermediate portion 343 is fixed by a fastener 316 to an intermediate plate 314 fixed to an intermediate portion of the fixed seat 31. An upper spring 317 is mounted between a plate 315 fixed to an upper end of the fixed seat 31 and an upper end of the intermediate portion 343 of the resilient pressing member 34 to bias the upper end of the axle 331 of the driven roller 33 toward the driving roller 32. A lower spring 317a is mounted between another plate 315a fixed to a lower end of the fixed seat 31 and a lower end of the intermediate portion 343 of the resilient pressing member 34 to bias the lower end of the axle 331 of the driven roller 33 toward the driving roller 32. A photoelectric sensor 43 is mounted to a plate 431 fixed to the fixed seat 31 and opposite to the resilient pressing member 34. The photoelectric sensor 43 can detect access of an optical disk A to and from the container 1 via the access slot 13.

Figure 8:
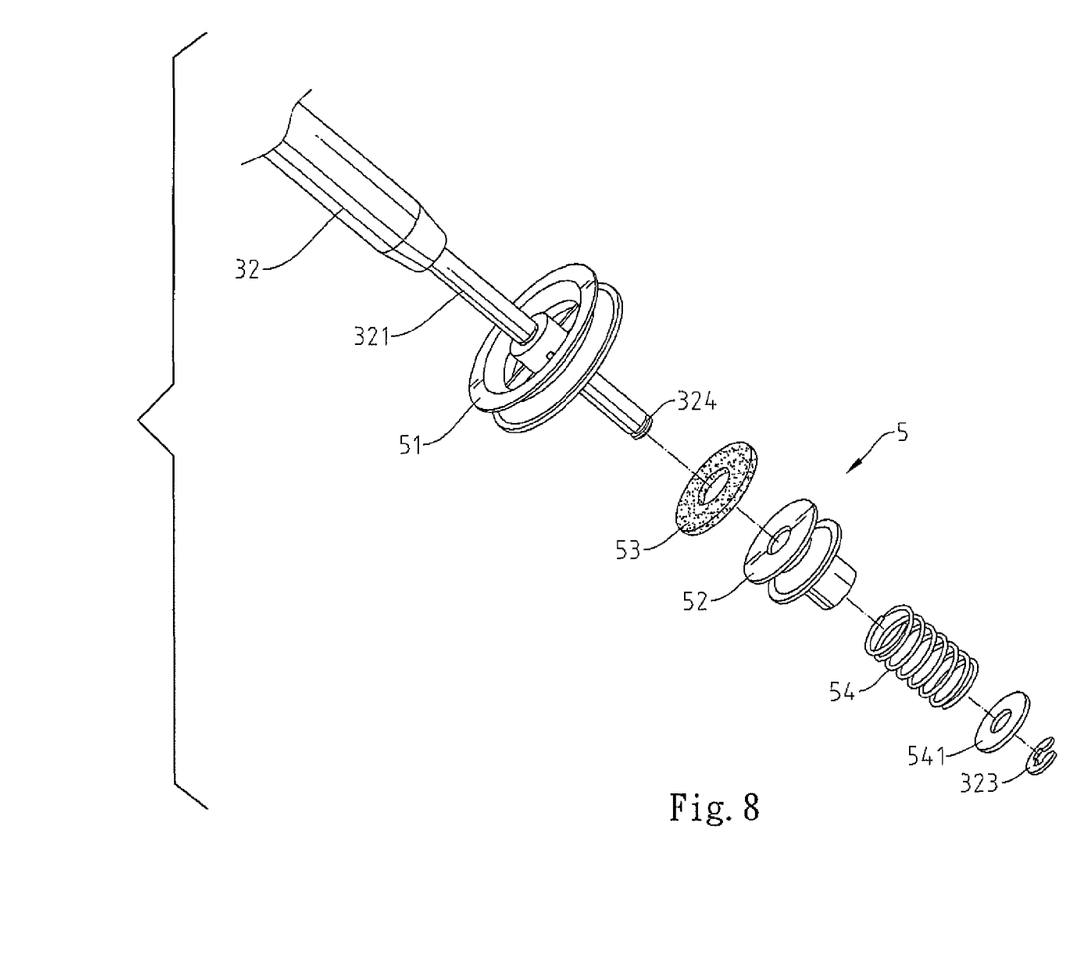
FIG. 8 shows a partial, exploded, perspective view of the driving device and the holding/transporting device of FIG. 7.

According to the preferred form shown, the first driving device 5 includes a pulley 51 fixed to the lower end of the axle 321 of the driving roller 32, a friction member 53 mounted around the lower end of the axle 321 and below the pulley 51, a wheel 52 rotatably mounted around the lower end of the axle 321 and below the friction member 53, and a compression spring 54 mounted around the lower end of the axle 321 and below the wheel 52 (FIG. 8). A washer 541 and a retainer 323 such as a C-clip are mounted to a distal section of the lower end of the axle 321 to position the pulley 51, the friction member 53, and the wheel 52. A distal section of the lower end of the axle 321 includes an annular retaining groove 324 for receiving and positioning the retainer 323. The friction member 53 is preferably made of wool felt. Furthermore, the friction member 53 is in friction contact with the pulley 51 and the wheel 52 under the action of the compression spring 54 to allow joint rotation of the pulley 51, the wheel 52, and the friction member 53.

According to the preferred form shown, the first driving device 5 further includes a transmission mechanism 55 to provide interconnection between the pulley 51, the friction member 53, and the movable wheel 52. With reference to FIGS. 2-6, the transmission mechanism 55 includes a motor 551 having an output shaft. A pulley 552 is mounted on the output shaft of the motor 551 to rotate therewith. A belt 553 is mounted around the pulley 552 and a speed-reduction pulley 554 to which a smaller a pulley 555 is mounted. The pulley 555 is connected by a belt 556 to the pulley 51 on the axle 321 of the driving roller 32. When the motor 551 is activated, the driving roller 32 as well as the friction member 53 and the wheel 52 on the axle 321 are rotated.

According to the preferred form shown, the first ejecting device 6 includes an ejecting member 61 having a pivot 63 on an end thereof. The pivot 63 is rotatably supported by two spaced supports 16 fixed to the bottom of the casing 11. The other end 62 of the ejecting member 61 includes an elongated guide groove 64. A driving wheel 65 includes a shaft 67 rotatably supported by two spaced supports 17 fixed to the bottom of the casing 11. An eccentric rod 66 projects from a side of the driving wheel 65 and is slideably received in the elongated guide groove 64 of the ejecting member 61. The driving wheel 65 is connected by a belt 56 to the wheel 52 on the axle 321. Thus, when the driving roller 32 rotates, the driving wheel 65 rotates and causes pivotal movement of the ejecting member 61 about the pivot 63.

According to the preferred form shown, an optical disk drive 7, a second holding/transporting device 3a, a second driving device 5a, and a second ejecting device 6a are mounted in the casing 1. The second holding/transporting device 3a is identical to the first holding/transporting device 3, the second driving device 5a is identical to the first driving device 5, and the second ejecting device 6a is identical to the first ejecting device 6. The related arrangements between the second holding/transporting device 3a, the second driving device 5a, and the second ejecting device 6a are identical to those between the first holding/transporting device 3, the first driving device 5, and the first ejecting device 6. It can be appreciated that the second holding/transporting device 3a, the second driving device 5a, and the second ejecting device 6a control movement of an optical disk A between one of the storage compartments 212 and the optical disk drive 7 while the first holding/transporting device 3, the first driving device 5, and the first ejecting device 6 control movement of an optical disk A between one of the storage compartments 212 and the access slot 13 of the container 1.

Figure 10:
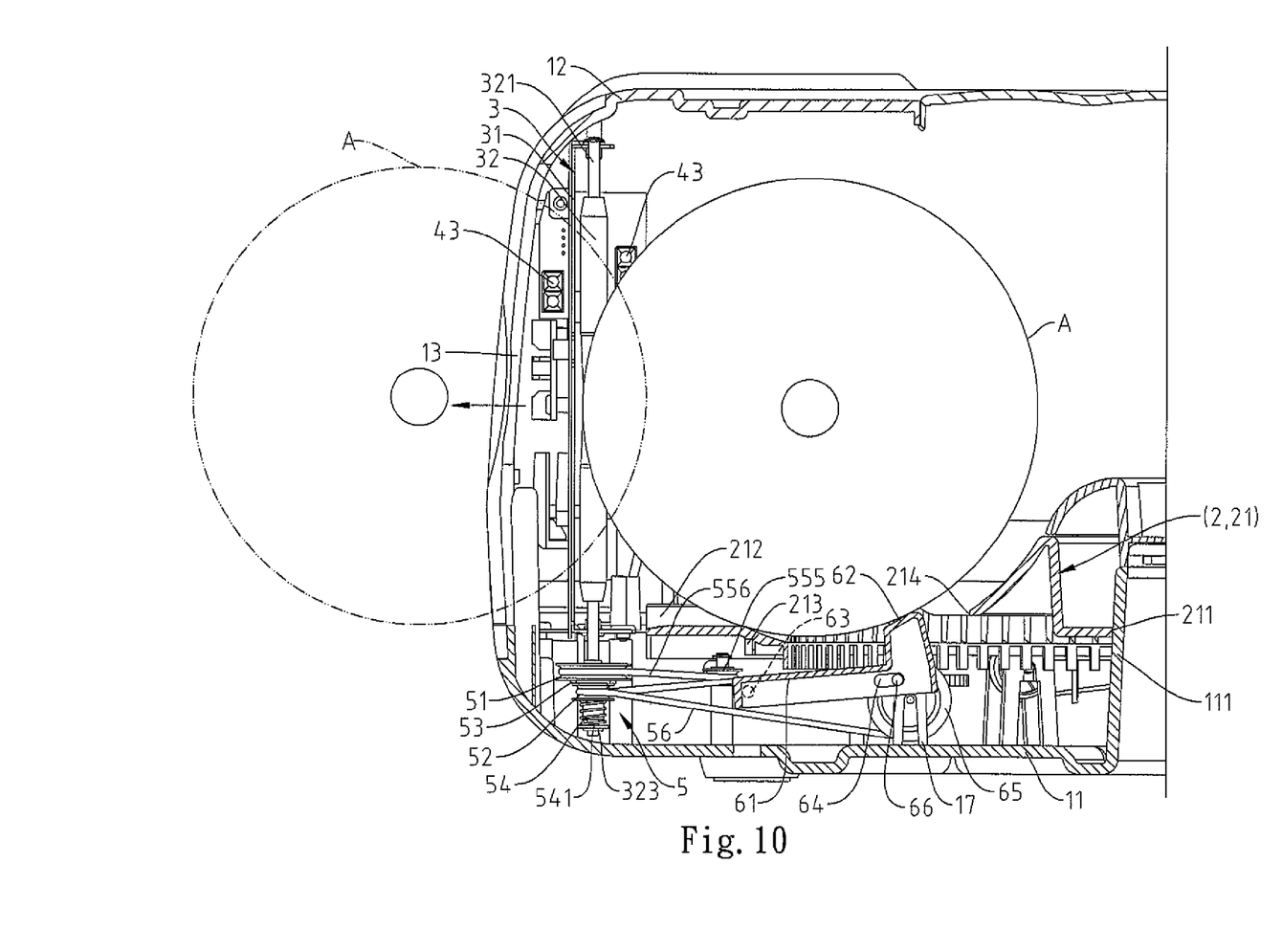
FIG. 10 is a partial, cross-sectional view similar to FIG. 2, illustrating ejection of an optical disk.
Figure 11:
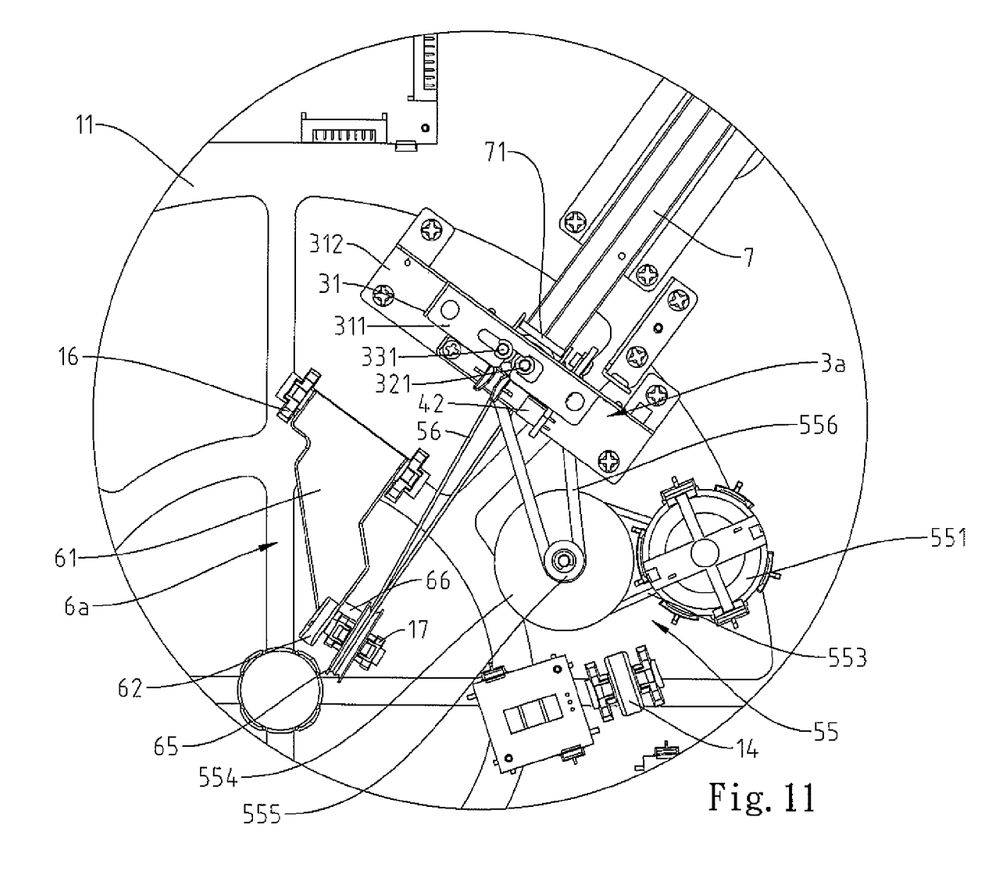
FIG. 11 shows a partial, enlarged, bottom view of the storage/retrieval device of FIG. 3.
Figure 12:
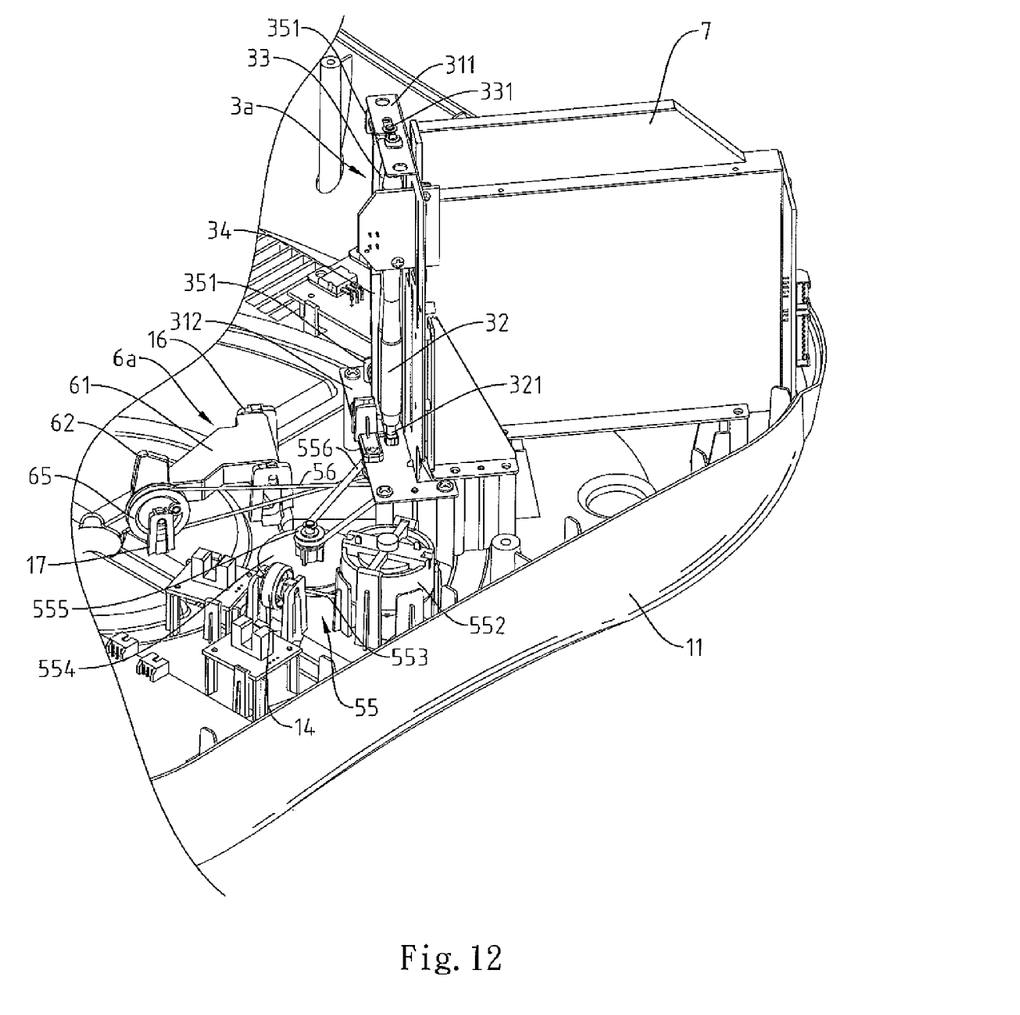
FIG. 12 shows a partial, perspective view of the components of FIG. 11.

Now that the basic construction of the storage/retrieval device of the preferred teachings of the present invention has been explained, the operation and some of the advantages of the storage/device can be set forth and appreciated. FIG. 2 shows an optical disk A in a storage state in one of the storage compartments 212. FIG. 10 shows retrieval of the optical disk A. Storage/retrieval of the optical disk A will now be set forth.

When a user intends to retrieve a specific optical disk A located in a specific position, the control buttons 41 are operated until the corresponding digital number associated with the specific optical disk A is shown on the display 42. The motor 22 is activated to rotate the disk shelf 21 until the optical disk A faces the access slot 13. The motor 551 of the first driving device 5 is then activated. The driving roller 32 rotates through transmission by the belt 553, the speed-reduction pulley 554, the smaller pulley 555, the belt 556, and the pulley 51. At the same time, the driving wheel 65 of the first ejecting device 6 rotates such that the eccentric rod 66 moves in the elongated guide groove 64 and urges the ejecting member 61 to pivot. While the eccentric rod 66 is moving toward one of two ends of the elongated guide groove 64, the free end 62 of the ejecting member 61 moves upward through the opening 214 into one of the storage compartments 212 and pushes the optical disk A in the storage compartment 212 slightly outward to a position in contact with the rollers 32 and 33 (FIG. 10). When the eccentric rod 66 reaches one of the ends of the elongated guide groove 64, the resistant force imparted to the eccentric rod 66 is larger than the frictional force between the friction member 53 and the wheel 52 under the action of the compression spring 54 of the first driving device 5. As a result, rotation of the driving wheel 65 is stopped, and pivotal movement of the ejecting member 61 is also stopped. But the driving roller 32 continues to rotate while the wheel 52 stands still (i.e., the wheel 52 cannot rotate together with the driving roller 32). Continuous rotation of the driving roller 32 causes outward movement of the optical disk A via the access slot 13 to a position shown by the dotted line in FIG. 10 for retrieval. It can be appreciated that the driven roller 33 is moved away from the driving roller 32 by the thickness of the optical disk A during outward movement of the optical disk A. When the optical disk A completely leaves the driving roller 32, the driven roller 33 is pushed toward the driving roller 32 under the action of the upper and lower springs 317 and 317a acting on the resilient pressing member 34. The driving roller 32 is stopped after a preset period of time, and the driven roller 33 is stopped accordingly.

When storage of an optical disk A into the storage/retrieval device according to the preferred teachings of the present invention is required, the storage compartment 212 for receiving the optical disk A can be selected by operating the control buttons 41 and can be shown on the display 42. The motor 22 is activated to rotate the disk shelf 21 until the selected storage compartment 212 faces the access slot 13. The optical disk A is then placed into the gap between the rollers 32 and 33 via the access slot 13, and the motor 551 is activated to rotate in a reverse direction such that the optical disk A is moved by the rollers 32 and 33 into the selected storage compartment 212.

It can be appreciated that the rollers 32 and 33 can slightly move along their longitudinal axes and that the driven roller 33 can move in a direction perpendicular to its longitudinal axis such that the optical disk A can be reliably held during its movement to and from the storage compartment 212.

Figure 13:
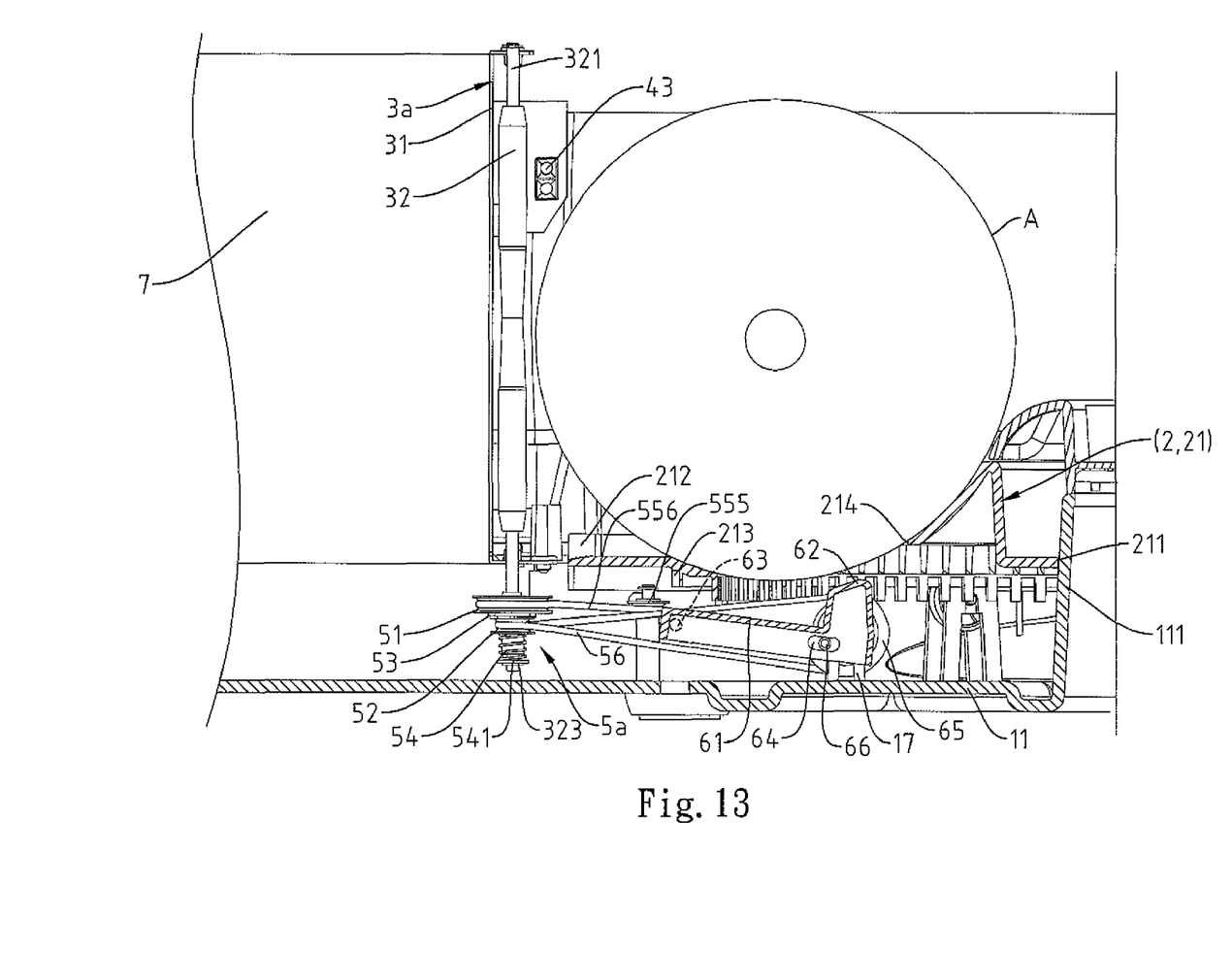
FIG. 13 shows a partial, cross-sectional view of the storage/retrieval device of FIG. 1, illustrating locations of an optical disk drive and an optical disk in the storage position.
Figure 14:
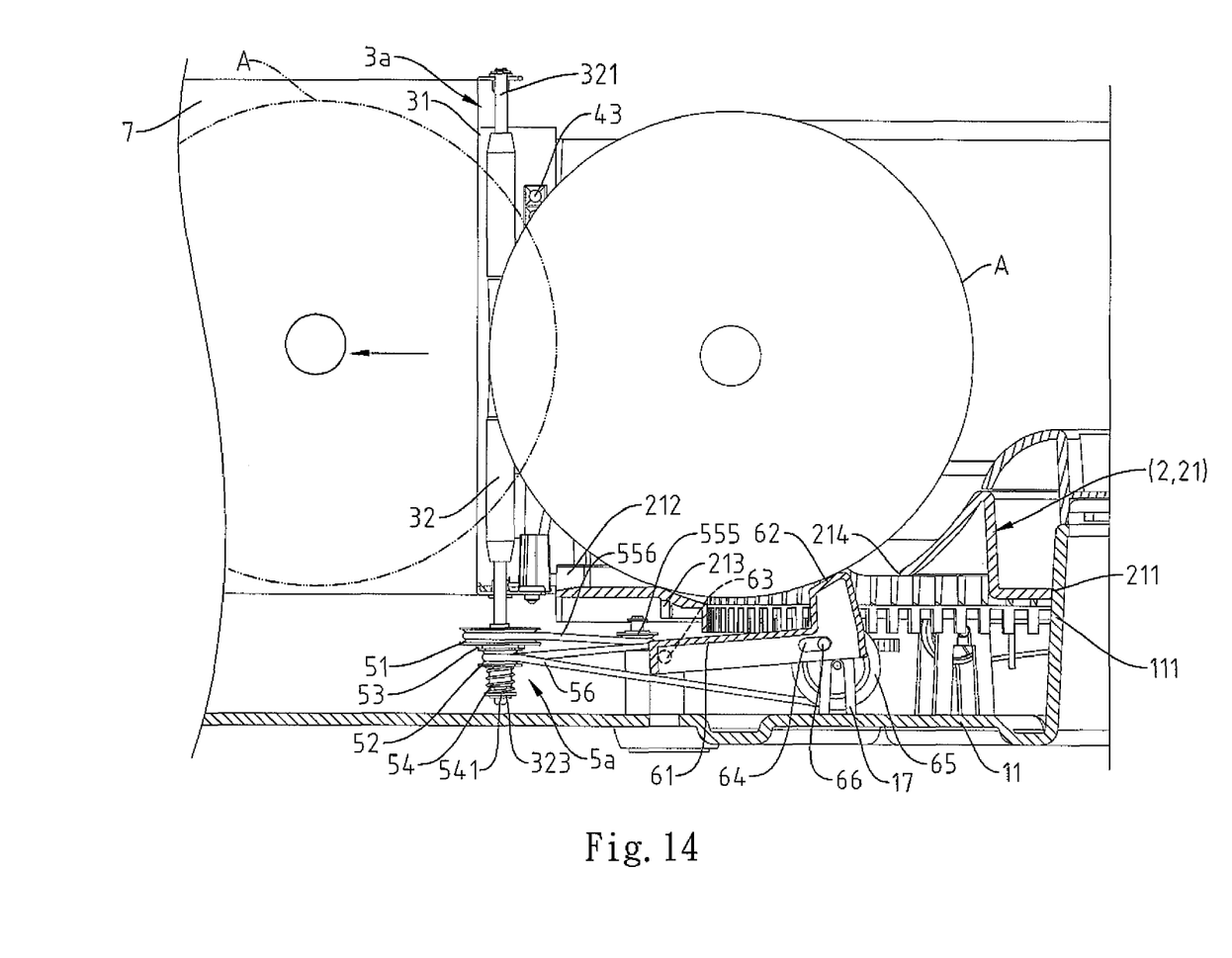
FIG. 14 is a partial, cross-sectional view similar to FIG. 13, illustrating insertion/ejection of an optical disk into/out of the optical disk drive.

When the user intends to put a specific optical disk A located in one of the storage compartments 212 into the optical disk drive 7 for proceeding with reading/writing operation, the control buttons 41 are operated until the corresponding digital number associated with the specific optical disk A is shown on the display 42. The motor 22 is activated to rotate the disk shelf 21 until the optical disk A faces an access opening 71 of the optical disk drive 7 that is aligned with a gap between the rollers 32 and 33 of the second holding/transporting device 3a. The motor 551 of the second driving device 5a is then activated to move the optical disk A into the optical disk drive 7 through the access opening 71. Specifically, the driving roller 32 of the second holding/transporting device 3a is driven by the motor 551 of the second driving device 5a to rotate through transmission by the belt 553, the speed-reduction pulley 554, the smaller pulley 555, the belt 556, and the pulley 51 of the second driving device 5a. At the same time, the driving wheel 65 of the second ejecting device 6a rotates such that the eccentric rod 66 moves in the elongated guide groove 64 and urges the ejecting member 61 to pivot. While the eccentric rod 66 is moving toward one of two ends of the elongated guide groove 64, the free end 62 of the ejecting member 61 moves upward through the opening 214 into one of the storage compartments 212 and pushes the optical disk A in the storage compartment 212 slightly outward to a position in contact with the rollers 32 and 33 of the second holding/transporting device 3a that faces the access opening 71 of the optical disk drive 7 (FIG. 13). When the eccentric rod 66 of the second ejecting device 6a reaches one of the ends of the elongated guide groove 64, the resistant force imparted to the eccentric rod 66 is larger than the frictional force between the friction member 53 and the wheel 52 of the second driving device 5a under the action of the compression spring 54 of the second driving device 5a. As a result, rotation of the driving wheel 65 of the second ejecting device 6a is stopped, and pivotal movement of the ejecting member 61 is also stopped. But the driving roller 32 of the second holding/transporting device 3a continues to rotate while the wheel 52 stands still (i.e., the wheel 52 cannot rotate together with the driving roller 32). Continuous rotation of the driving roller 32 causes outward movement of the optical disk A into the optical disk drive 7 via the access opening 71 (FIG. 14). It can be appreciated that the driven roller 33 of the second holding/transporting device 3a is moved away from the driving roller 32 by the thickness of the optical disk A during outward movement of the optical disk A. When the optical disk A completely leaves the driving roller 32, the driven roller 33 is pushed toward the driving roller 32 under the action of the upper and lower springs 317 and 317a acting on the resilient pressing member 34. The driving roller 32 is stopped after a preset period of time, and the driven roller 33 is stopped accordingly. It can be appreciated that the storage/retrieval device according to the preferred teachings of the present invention can be connected to a computer to proceed with reading/writing operation of the optical disk A.

When it is desired to move the optical disk A in the optical disk drive 7 back into one of the storage compartments 212, the storage compartment 212 for receiving the optical disk A can be selected by operating the control buttons 41 and can be shown on the display 42. The motor 22 is activated to rotate the disk shelf 21 until the selected storage compartment 212 faces the access opening 71 of the optical disk drive 7. The motor 551 is activated to rotate in a reverse direction such that the optical disk A ejected out of the optical disk drive 7 is moved by the rollers 32 and 33 of the second holding/transporting device 3a into the selected storage compartment 212.

Now that the basic teachings of the present invention have been explained, many extensions and variations will be obvious to one having ordinary skill in the art. For example, it can be appreciated that the optical disk drive 7, the second ejecting device 6a, the second holding/transporting device 3a, and the second driving device 5a can be omitted such that the storage/retrieval device according to the present invention can be utilized for simple storage/retrieval operation of optical disks. Furthermore, a second optical disk drive 7, a third holding/transporting device 3, a third ejecting device 6, and a third driving device 5 can be provided in the container 1 for controlling movement of an optical disk A between one of the storage compartments 212 and the second optical disk drive 7.

Since only one motor 551 is utilized to drive the first and second ejecting devices 6 and 6a and the first and second holding/transporting devices 3 and 3a, the storage/retrieval device according to the preferred teachings of the present invention has a simplified structure and, thus, occupies a smaller space while saving the costs without sacrificing convenient operation and reliable storage/retrieval of optical disks.

Thus since the invention disclosed herein may be embodied in other specific forms without departing from the spirit or general characteristics thereof some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A storage/retrieval device for optical disks comprising, in combination:
   a container including an access slot;
   a disk shelf rotatably mounted in the container, with the disk shelf including a plurality of storage compartments each for receiving an optical disk;
   a disk shelf motor for driving the disk shelf to rotate;
   a first fixed seat mounted in the container;
   a first driving roller rotatably mounted to the first fixed seat, with the first driving roller including a first axle having an end;
   a first driven roller rotatably mounted to the first fixed seat and spaced from the first driving roller by a gap, with the gap between the first driving roller and the first driven roller facing the access slot;

a first pulley mounted to the end of the first axle to rotate therewith;

a first wheel rotatably mounted around the end of the first axle;

a first friction member mounted around the end of the first axle and between the first pulley and the first wheel;

a first compression spring mounted around the end of the first axle, with the first compression spring biasing the first wheel against the first friction member and the first pulley such that when the first driving roller rotates, the first wheel rotates together with the pulley due to friction between the first friction member and the first wheel and friction between the first friction member and the first pulley;

a first motor coupled with the first pulley for driving the first pulley and the first driving roller such that the first driving roller and the first driven roller rotate in opposite directions to move an optical disk into or out of the container via the access slot;

a first ejecting member including a first end pivotably supported in the container and a second end, with the first ejecting member being pivotable between a first position in one of the plurality of storage compartments for moving an optical disk in the storage compartment out of the storage compartment and a second position outside the storage compartment;

a first driving wheel rotatably supported in the container and coupled with the second end of the first ejecting member; and a first belt connected between the first driving wheel and the first pulley such that rotation of the first pulley causes rotation of the first driving wheel and pivotal movement of the first ejecting member.

2. The storage/retrieval device for optical disks as claimed in claim 1, with the first fixed seat further including spaced first and second plates each having an elongated slot, with the end of the first axle rotatably extending through the elongated slot of the second plate, with the first axle further including another end rotatably extending through the elongated slot of the first plate, with the first driving roller being movable along a longitudinal axis thereof, with the first driven roller including a second axle rotatably extending through the elongated slots of the first and second plates, with the first driven roller being movable along a longitudinal axis thereof, and with the first driven roller being movable along the first and second elongated slots in a direction perpendicular to the longitudinal axis of the first driven roller.

3. The storage/retrieval device for optical disks as claimed in claim 1, further comprising, in combination: a resilient pressing member including two ends respectively pressing against two ends of the second axle, with the resilient pressing member further including an intermediate portion between the two ends thereof and fixed to the first fixed seat; and two springs each having a first end attached to the first fixed seat and a second end attached to one of the two ends of the resilient pressing member, biasing the two ends of the resilient pressing member against the two ends of the second axle to bias the first driven roller toward the first driving roller.

4. The storage/retrieval device for optical disks as claimed in claim 1, with the second end of the first ejecting member including an elongated guide groove having two ends, with the first driving wheel including an eccentric rod projecting from a side thereof, with the eccentric rod being slideably received in the elongated guide groove of the first ejecting member, with the first ejecting member pivoting from one of the first and second positions to the other of the first and second positions when the eccentric rod is moving from one of the two ends of the elongated guide groove to the other of the two ends of the elongated guide groove, with a resistant force imparted to the eccentric rod being larger than the frictional between the first friction member and the first wheel when the eccentric rod is at one of the two ends of the elongated guide groove such that the first wheel and the first driving wheel do not rotate while the first driving roller is rotating.

5. The storage/retrieval device for optical disks as claimed in claim 4, with the first driving roller and the first driven roller moving an optical disk ejected from one of the plurality of storage compartments by the first ejecting member out of the container via the access slot or moving an optical disk into one of the plurality of storage compartments when the eccentric rod is at one of the two ends of the elongated guide groove of the first ejecting member while the first driving roller is rotating.

6. The storage/retrieval device for optical disks as claimed in claim 1, further comprising, in combination:

an optical disk drive mounted in the container and including an access opening;

a second fixed seat mounted in the container;

a second driving roller rotatably mounted to the second fixed seat, with the second driving roller including a second axle having an end;

a second driven roller rotatably mounted to the second fixed seat and spaced from the second driving roller by a gap, with the gap between the second driving roller and the second driven roller facing the access opening;

a second pulley mounted to the end of the second axle to rotate therewith;

a second wheel rotatably mounted around the end of the second axle;

a second friction member mounted around the end of the second axle and between the second pulley and the second wheel;

a second compression spring mounted around the end of the second axle, with the second compression spring biasing the second wheel against the second friction member and the second pulley such that when the second driving roller rotates, the second wheel rotates together with the second pulley due to friction between the second friction member and the second wheel and friction between the second friction member and the second pulley;

a second motor coupled with the second pulley for driving the second pulley and the second driving roller such that the second driving roller and the second driven roller rotate in opposite directions to move an optical disk in one of the plurality of storage compartments into the optical disk drive via the access opening or to move an optical disk from the optical disk drive into one of the plurality of storage compartments;

a second ejecting member including a first end pivotably supported in the container and a second end, with the second ejecting member being pivotable between a first position in one of the plurality of storage compartments for moving an optical disk in the storage compartment out of the storage compartment and a second position outside the storage compartment;

a second driving wheel rotatably supported in the container and coupled with the second end of the second ejecting member; and a second belt connected between the second driving wheel and the second pulley such that rotation of the second pulley causes rotation of the second driving wheel and pivotal movement of the second ejecting member.

* * * * *